United States Patent
Korneev et al.

[11] Patent Number: 6,108,606
[45] Date of Patent: Aug. 22, 2000

[54] WAVEGUIDE DISTURBANCE DETECTION METHOD

[75] Inventors: Valeri A. Korneev, Albany; Kurt T. Nihei, Oakland; Larry R. Myer, Benicia, all of Calif.

[73] Assignee: Gas Research Institute, Chicago, Ill.

[21] Appl. No.: 08/929,955

[22] Filed: Sep. 15, 1997

Related U.S. Application Data

[60] Provisional application No. 60/026,476, Sep. 17, 1996.

[51] Int. Cl.$^7$ .................................................. G01V 1/42
[52] U.S. Cl. ................................................. 702/13; 702/2
[58] Field of Search ................... 702/10, 13, 6, 702/2; 367/30

[56] References Cited

U.S. PATENT DOCUMENTS

| | | | |
|---|---|---|---|
| H1307 | 5/1994 | Krohn | 367/57 |
| 1,240,328 | 9/1917 | Fessenden | 702/1 |
| 2,231,243 | 2/1941 | Beers | 181/0.5 |
| 2,276,335 | 3/1942 | Peterson | 181/0.5 |
| 3,154,760 | 10/1964 | Johnson | 345/15.5 |
| 3,858,167 | 12/1974 | Stas et al. | 340/15.5 |
| 4,214,226 | 7/1980 | Narasimhan et al. | 367/27 |
| 4,562,557 | 12/1985 | Parks et al. | 367/27 |
| 4,663,593 | 5/1987 | Nekut, Jr. | 324/345 |
| 4,991,095 | 2/1991 | Swanson | 364/421 |
| 5,005,159 | 4/1991 | Krohn | 367/57 |
| 5,062,084 | 10/1991 | Schoepf et al. | 367/13 |
| 5,144,590 | 9/1992 | Chon | 367/57 |
| 5,217,018 | 6/1993 | Dias | 128/662.06 |
| 5,260,911 | 11/1993 | Mason et al. | 367/57 |
| 5,379,354 | 1/1995 | Jenkins . | |
| 5,678,643 | 10/1997 | Robbins et al. | 175/45 |

OTHER PUBLICATIONS

S.J. Laster, Joe G. Foreman and A. Frank Linville, Theoretical Investigation of Modal Seismograms for a Layer Over a Half Space, *Geophysics*, vol. 30, No. 4, Aug. 1996, Tulsa, Oklahoma, pp. 571–596.

G.R. Franssens, P.E. Lagasse and I.M. Mason, Study of the leaking channel modes of in–seam exploration seismology by means of synthetic seismograms, *Geophysics*, vol. 50, No. 3, Mar. 1985, Tulsa, Oklahoma, pp. 414–424.

C.K. Jen, Ph. de Herring, P. Sutcliffe and J.F. Bussiere, Ultrasonic Monitoring of the Molten Zone of Single–Crystal Germanium, *Material Evaluation*, vol. 49, No. 6, Jun. 1991, Columbus, Ohio, pp. 701–707.

*Primary Examiner*—Christine K. Oda
*Assistant Examiner*—Victor J. Taylor
*Attorney, Agent, or Firm*—Pauley Petersen Kinne & Fejer

[57] ABSTRACT

A method for detection of a disturbance in a waveguide comprising transmitting a wavefield having symmetric and antisymmetric components from a horizontally and/or vertically polarized source and/or pressure source disposed symmetrically with respect to the longitudinal central axis of the waveguide at one end of the waveguide, recording the horizontal and/or vertical component or a pressure of the wavefield with a vertical array of receivers disposed at the opposite end of the waveguide, separating the wavenumber transform of the wavefield into the symmetric and antisymmetric components, integrating the symmetric and antisymmetric components over a broad frequency range, and comparing the magnitude of the symmetric components and the antisymmetric components to an expected magnitude for the symmetric components and the antisymmetric components for a waveguide of uniform thickness and properties thereby determining whether or not a disturbance is present inside the waveguide.

5 Claims, 2 Drawing Sheets

WAVEGUIDE DISTURBANCE DETECTION METHOD

CROSS REFERENCE TO RELATED APPLICATION

This application claims the benefit of U.S. Provisional Application Ser. No. 60/026,476, filed Sep. 17, 1996.

The present invention was made, in part, under Department of Energy Contract No. DE-AC03-76SF00098. The U.S. Government has certain rights in this invention.

BACKGROUND OF THE INVENTION

1. Field of the Invention

This invention relates to a method for detecting disturbances which disrupt the lateral continuity of a waveguide. More particularly, this invention relates to a method for the detection of disturbances in a waveguide based on relationships between the properties of layers and bounding surfaces and the propagation velocities and particle displacements of various modes of guided waves that can be expected in underground formations, in particular gas reservoirs.

2. Description of Prior Art

Gas reservoir production is controlled by the architecture of flow units, fractures, sealing elements and bounding surfaces that result from deposition and diagenesis. Differences between the elastic properties of these units and surfaces allow many of them to support the propagation of guided waves. Conventional techniques for delineating the continuity of flow units and sealing and bounding surfaces include crosswell, vertical seismic profiling and surface seismic techniques. A crosswell technique for detecting and analyzing the continuity of subsurface formations in the earth between existing wells is taught by U.S. Pat. No. 5,144,590. In accordance with the teachings of the '590 patent, seismic energy is transmitted from a seismic source at various selected fixed depths in one well and detected as data by a plurality of sensing geophones deployed at selected fixed depths in one or more adjacent wells. A frequency domain decomposition process is performed on the data in order to determine if any of the formations located between the wells function as waveguides for seismic energy within the frequencies of interest. Those formations exhibiting waveguide properties are indicated as continuous between the wells. However, this method utilizes only the time-frequency characteristics of the recorded wavefield which can be misleading for a wide class of waveguide disturbances. In addition, this method will not work if the high frequencies utilized to generate the wavefield couple across the disturbance, a result which we have found, by numerical analysis, often to be the case.

An alternative known method for determining the presence of waveguide disturbances in the earth is seismic crosswell tomography in which seismic energy emitted from sources in one well or borehole is sensed and recorded as seismic data by arrays of detectors in one or more other wells. The recorded seismic data is then processed to form tomographic images of interwell geologic features based on the crosswell seismic data. When used for geophysical purposes, tomographic imaging between boreholes can produce very good images provided certain conditions are present. Unfortunately, in most petroleum and gas reservoirs, these conditions are often very difficult to achieve. In particular, because the imaging solutions are intended to produce 2-dimensional results, the well boreholes must be aligned; that is, they must be vertical or both deviate in the same plane. Another problem is that a large data sample or window of observed transmission energy is required. To obtain such data, the seismic source is required to emit energy in the source well to sensors in the receiver well or wells at depths of several hundred feet both above and below the target reservoir or formation of interest. Because it is rare for wells to be drilled deeper than the formations of interest, this condition is very hard to achieve. Finally, tomographic reconstruction or imaging processes are based on an interwell velocity model. Such a velocity model requires precise positioning or location data for the well, in addition to the observed signal travel times. Thus, accurate location data for the wells is mandatory. And, finally, seismic crosswell tomography is very expensive and lacks horizontal resolution when the well spacings are large. Seismic crosswell tomography is taught, for example, by U.S. Pat. No. 2,231,243 and U.S. Pat. No. 4,214,226.

A method for seismic surveying using seismic waveguides in the earth in which seismic energy is transmitted from outside the waveguide and detected within the waveguide or vice-versa is taught by U.S. Pat. No. 5,260,911. Coupling of energy between the outside and inside of the waveguide is affected by energy leakage at coupling sites where the waveguide departs from planarity. The method analyzes seismic signals to determine the position and nature of coupling sites and the propagation characteristics of the waveguide. U.S. Pat. No. 3,154,760 teaches a method for recording and reproducing seismic waves. U.S. Pat. No. 5,062,084 teaches a method and apparatus for acquiring acoustical data from a borehole using a borehole digital geophone tool which is capable of operating from a standard 7-conductor logging cable with no special cables being required because the individual digital geophone modules which form the tool are connected together by short, separate lengths of the same 7-conductor cable. The borehole digital geophone tool is indicated to be useful in carrying out tomography surveys.

Methods for determining the continuity of a subsurface formation layer located between two vertical boreholes are taught by U.S. Pat. No. 5,005,159, U.S. Pat. No. 4,562,557, and U.S. Statutory Invention Registration H1307. U.S. Pat. No. 3,858,167 teaches an arrangement for determination of the continuity of thickness and of structural-tectonic elements of coal seams in which a transverse seam wave excited by the blast of charges of a directionally oriented blast base is used to determine the continuity of thickness and structural-tectonic elements of coal seams. Direct elements of transverse seam waves and elements reflected from tectonic dislocations are picked up by pick-up devices and, by their character, the conditions of the structural-tectonic elements of the coal seam may be determined. U.S. Pat. No. 2,276,335 teaches a seismic prospecting method for obtaining necessary information regarding the depth of a weathered layer of the earth utilizing the time required for waves to travel vertically through the weathered layer and the wave velocity in the earth just beneath the weathered layer.

SUMMARY OF THE INVENTION

It is an object of this invention to provide a method for determining the presence of disturbances within a waveguide which is relatively inexpensive compared to known methods such as seismic crosswell tomography.

It is another object of this invention to provide a method for determining the presence of disturbances within a waveguide utilizing both frequency and spacial symmetries and antisymmetries to determine if the waveguide is undisturbed or disturbed.

It is yet another object of this invention to provide a method for determining the vertically asymmetric discontinuities of oil or gas producing reservoir rocks for the purpose of production modeling.

It is another object of this invention to provide a method for detecting the presence of faults in coal seams which disrupt the long wall mining process.

It is yet another object of this invention to provide a method for use in the nondestructive testing of engineered bars and layered structures.

These and other objects of this invention are achieved by a method for detection of a disturbance in a waveguide comprising the steps of transmitting the wavefield having symmetric and antisymmetric components from a horizontally polarized and/or vertically polarized source and/or pressure source disposed symmetrically with respect to a longitudinal central axis of a waveguide at one end of the waveguide. A horizontal and/or a vertical component of the wavefield and/or pressure is recorded using a vertical array of receivers symmetrically disposed at an opposite end of the wavefield. The wavefield is converted into frequency wavenumber domain, then separated into symmetric and antisymmetric wavenumber components which modules are then integrated over a broad frequency range to obtain symmetric and antisymmetric "modes" for different discrete wavenumbers. The magnitude of the "modes" for several lowest order wavenumbers are then compared to an expected magnitude for correspondent "modes" for a waveguide of uniform thickness and properties, thereby determining whether or not a disturbance is present inside the waveguide.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

Figure 1:
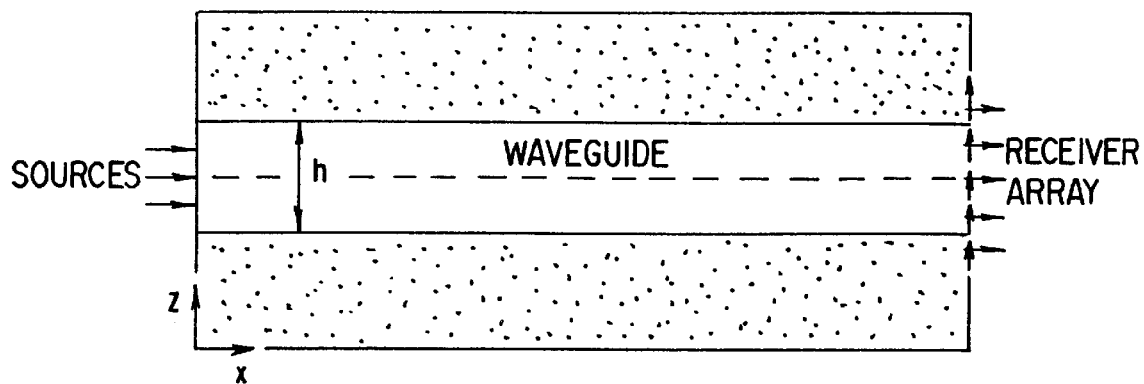
FIG. 1 is a schematic side view of a waveguide showing source and receiver locations for the transmitted wavefield.

In order to find and recover the most promising oil and gas reservoirs, it is necessary to be able to distinguish one or more physical properties of rocks with a resolution of a few meters at reservoir depths. Complete imaging of reservoir heterogeneity on this scale is a formidable task. In principle, it may be possible to image heterogeneity in this detail using crosswell tomography with closely-spaced wells and large apertures, however it is unlikely to be economic or practical, particularly in the oil and gas industries. Most of the benefits of improved recovery, either from infill drilling and recompletion of bypassed zones or from better-informed well placement and completion in new fields is achievable with the methodology of this invention which targets the architecture of the principle flow units and sealing elements.

Architecture implying systematic spatial arrangement is a better description of the hierarchical structure of flow units, sealing surface and bounding surfaces that result from deposition and diagenesis than is heterogeneity. The elastic properties of these units and surfaces differ from one another and from those of the adjacent rock. Many of these surfaces have elastic properties that support the propagation of guided waves. Indeed, in many situations, seismic crosswell data demonstrate that the dominant signals are guided waves rather than body waves or scattered waves.

Guided waves have been used extensively in coal seams to detect faults that affect long wall operations. We have determined that guided waves provide an efficient method of examining the reservoir structured architecture that most affects gas and oil production, without having to image all of the heterogeneous variations in a reservoir. Because the energy in guided waves is constrained to travel along thin layers, surfaces or interfaces, geometric spreading is confined to two dimensions as opposed to three dimensions for body waves. Accordingly, guided waves, which include channel waves and interface waves, can be detected over much longer distances than can body waves. Guided waves are, therefore, particularly well suited for examining the architecture of layers and surfaces in a reservoir.

In principle, the theory of guided waves is well known. Almost any interface or relatively thick layer can support a guided wave. Low velocity layers trap the energy so that it is transmitted over long distances as a dispersive wave in which the velocity varies with frequency. High velocity layers leak energy so that they are not as effective waveguides. Some conditions, particularly at liquid-solid interfaces, propagate Stoneley waves. A new type of wave that may be of great significance in reservoirs is an interface wave that propagates along a non-welded boundary.

Until recently, guided waves were regarded as noise, particularly in crosswell imaging, because they often obscure the identification of direct and primary reflected waves in fractured and bedded reservoirs. It is now recognized that guided waves contain valuable information related to the continuity and properties of thin layers on the surfaces which serve either as conduits or barriers to hydrocarbon flow. Techniques which employ guided waves offer the possibility of directly measuring the continuity and the properties of geologic units which control reservoir fluid transport.

Figure 2:
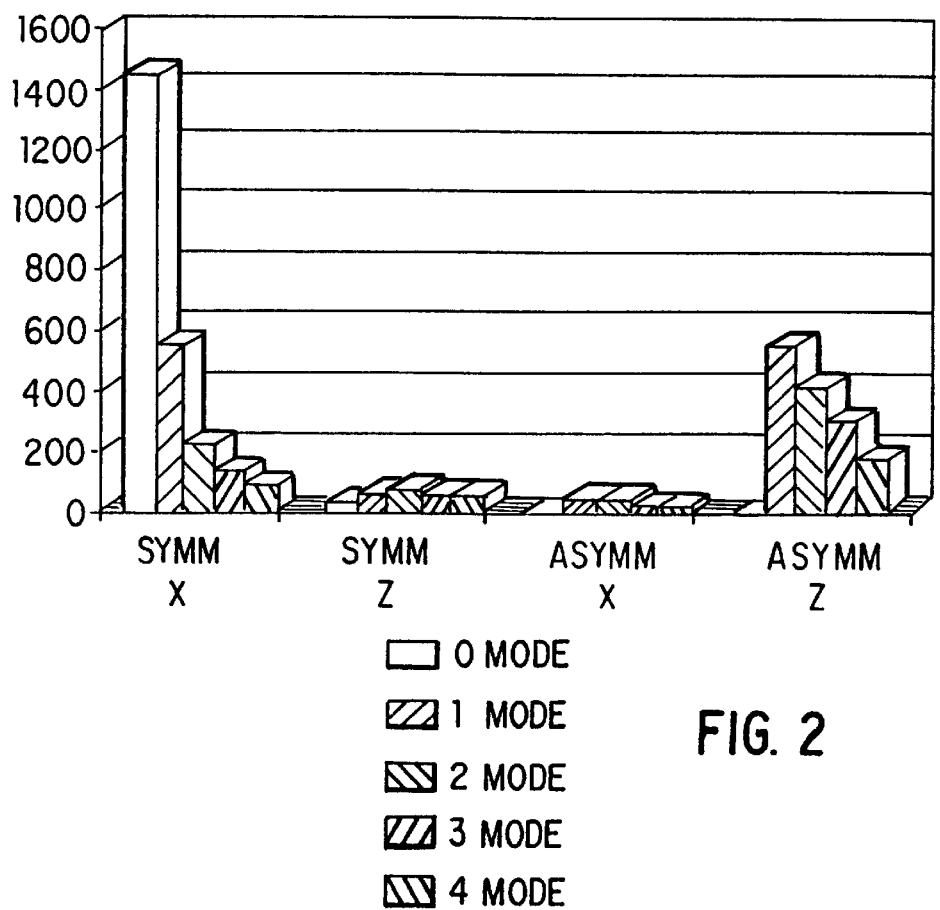
FIG. 2 is a diagram showing the results of the waveguide disturbance detection method analysis in accordance with the method of this invention for an undisturbed waveguide.
Figure 4:
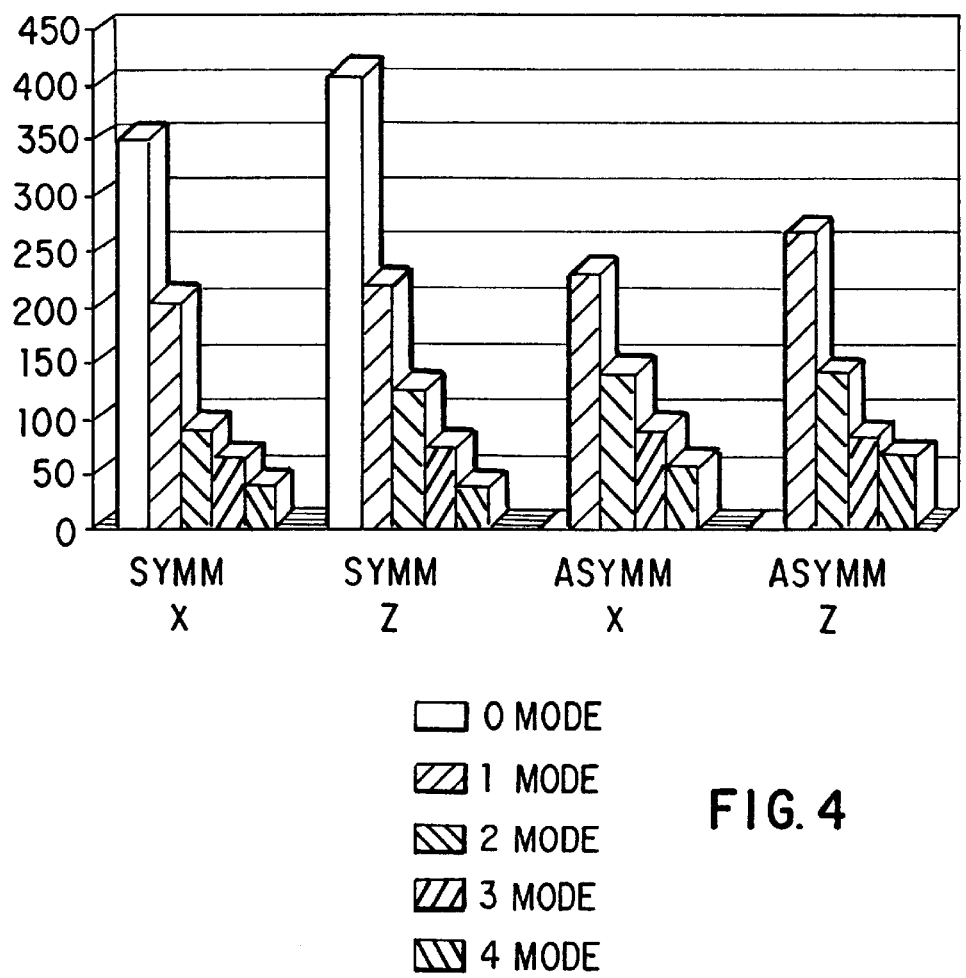
FIG. 4 is a schematic diagram showing the results of the waveguide disturbance detection method analysis in accordance with one embodiment of this invention for the disturbed waveguide shown in FIG. 3.

In the method in accordance with this invention, a wave source is placed in one borehole comprising one end of a waveguide and an array of receivers is placed in another borehole comprising the other end of the waveguide. The method includes a processing technique which converts the recorded wavefield in frequency wavenumber domain, then separates it into symmetric and antisymmetric components which are then integrated over a broad frequency range to obtain the "modes" for low order wavenumbers of each component. The magnitude of these "modes" vary in distinct ways according to the geometry of the waveguide. Thus, a continuous layer will have one set of "mode" values as illustrated in FIG. 2 while a faulted layer will have another set, as illustrated in FIG. 4.

Separation of the wave energy into the "modes" distinguishes the method of this invention from other methods for evaluating layer continuity because it focuses on extracting from the wavefield those characteristics which are distinctive to waveguides, that is, the modes carrying energy converted due to the geometry of the low velocity layer.

Data acquisition uses conventional, existing technology. Vertically and/or horizontally polarized sources and/or pressure sources are used. The method relies on symmetrical placement of the source with respect to the central axis of the waveguide. In practice, borehole sonic logs and other logs provide the information needed to establish shot locations. The central frequency of the source is such that its wavelength is less than the thickness of the waveguide. Current technology is the limiting factor in determining the minimum thickness of layers which can be logged.

Figure 3:
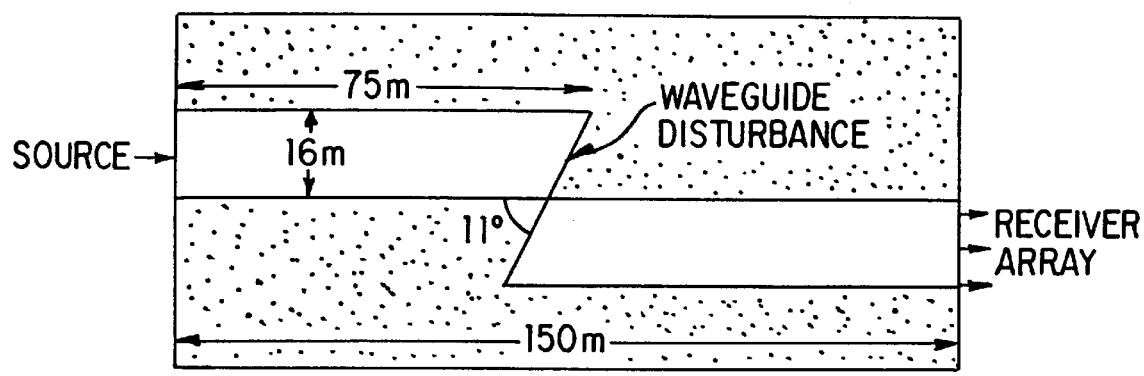
FIG. 3 is a schematic diagram showing a waveguide with a disturbance in the form of an offset.

As previously stated, the method of this invention utilizes sources of elastic waves located symmetrically with respect to the central axis of the waveguide. For an undisturbed waveguide, as shown in FIG. 1, the symmetry of the source location and the waveguide produces waves with wave motion that is either purely symmetric or purely antisymmetric with respect to the central axis of the waveguide. When the waveguide contains a disturbance, as shown in FIG. 3, the discontinuity acts as a source which repartitions the original wave motion for an undisturbed waveguide into wave motion that contains both symmetric and antisymmetric wave motion. The method of this invention is equally applicable to acoustic, elastic and electromagnetic waves.

In accordance with the method of this invention, identical sources of elastic, acoustic or electromagnetic waves are placed on one end of the waveguide as shown in FIG. 1. The source must be symmetrically disposed with respect to the central axis of the waveguide. In accordance with a particularly preferred embodiment of this invention, the source is placed at the central axis of the waveguide. The use of multiple off-axis sources is possible provided they are arranged symmetrically with respect to the central axis of the waveguide. The central frequency excited by the source must be high enough to produce a waves with wavelengths on the order of or less than the thickness of the waveguide, h.

At least one of a horizontal component of the wavefield, $u_x(z,t)$, where $u_x$ is the horizontal particle displacement, or the vertical component of the wavefield, $u_z(z,t)$, where $u_z$ is the vertical particle displacement, or a pressure field, $p(z,t)$, where $p(z,t)$ is the pressure, where z is a vertical position and t is time, or any combination of these data are recorded by the array of receivers at the opposite end of the waveguide. The properties and treatment of the horizontal component of the wavefield, $u_x(z,t)$ and the pressure $p(z,t)$ are analogous.

Processing of the data collected by the receiver array comprises the following five steps:

(1) Deconvolve the recorded wave field with the source wavelet.

(2) Transform the recorded wavefield, $u_x(z,t)$ and $u_z(z,t)$ into the spacial wave number domain using a Fourier transform in z as follows:

$u_x(k_z,t)$=Fourier transform in z $\{u_x(z,t)\}$ $u_z(k_z,t)$=Fourier transform in z $\{u_z(z,t)\}$.

where $k_z$ is a vertical wavenumber (3) Decompose $u_x(k_z,t)$ and $u_z(k_z,t)$ obtained as a result of the Fourier transforms in z into symmetric and antisymmetric components as follows:

$u_x^{symm}(k_z,t)$=Real $\{u_x(k_z,t)\}$ $u_x^{anti}(k_z,t)$=Imaginary $\{u_x(k_z,t)\}$ $u_z^{symm}(k_z,t)$=Real $\{u_z(k_z,t)\}$ $u_z^{anti}(k_z,t)$=Imaginary $\{u_z(k_z,t)\}$ (4) Transform the values for $u_x^{symm}(k_z,t)$, $u_x^{anti}(k_z,t)$, $u_z^{symm}(k_z,t)$, and $u_z^{anti}(k_z,t)$ obtained above into the frequency domain using a Fourier transform in t as follows:

$u_x^{symm}(k_z,f)$=Fourier transform in t $\{u_x^{symm}(k_z,t)\}$ $u_x^{anti}(k_z,f)$=Fourier transform in t $\{u_x^{anti}(k_z,t)\}$ $u_z^{symm}(k_z,f)$=Fourier transform in t $\{u_z^{symm}(k_z,t)\}$ $u_z^{anti}(k_z,f)$=Fourier transform in t $\{u_z^{anti}(k_z,t)\}$ Perform a summation of the modulus of the quantities obtained above over a frequency range to obtain the "modes", M:

$M_x^{symm}$=Summation over frequencies $f\{u_x^{symm}(k_z,f)\}$ $M_x^{anti}$=Summation over frequencies $f\{u_x^{anti}(k_z,f)\}$ $M_z^{symm}$=Summation over frequencies $f\{u_z^{symm}(k_z,f)\}$ $M_z^{anti}$=Summation over frequencies $f\{u_z^{anti}(k_z,f)\}$ FIG. 3 displays a waveguide of the same thickness and elastic properties as the continuous waveguide shown in FIG. 1 used to generate the results shown in FIG. 2 except that the waveguide contains a disturbance in the form of an offset or fault located at the center of the waveguide. FIG. 4 demonstrates that the offset acts as a secondary source that repartitions the original wavefield evenly in the symmetric and antisymmetric components. The presence of large low order wavenumber peaks in the symmetric z and antisymmetric x components is a direct indication that the waveguide contains a discontinuity.

Determination of whether the waveguide contains a disturbance is performed by comparison of $M_x^{symm}$, $M_x^{anti}$, $M_z^{symm}$, and $M_z^{anti}$ with the values for an undisturbed waveguide for a given source polarization, the values for which are shown in Table 1.

| Source Polarization | $M_x^{symm}$ | $M_x^{anti}$ | $M_z^{symm}$ | $M_z^{anti}$ |
| --- | --- | --- | --- | --- |
| Horizontal, $s_x$ | >0 | approx. 0 | approx. 0 | >0 |
| Vertical, $s_z$ | approx. 0 | >0 | >0 | approx. 0 |

Appearance of behavior differing from the values shown in the above Table 1 indicates the presence of a disturbance located within the waveguide.

EXAMPLE

This example is provided for a low velocity waveguide (P-wave velocity=2400 m/s and S-wave velocity=1386 m/s) embedded in a higher velocity host medium (P-wave velocity=3000 m/s and S-wave velocity=1732 m/s). A horizontally polarized source with a frequency bandwidth of 50–600 Hz is located along the central axis of the waveguide. A vertical array of 64 two-component receivers is located on the opposite end of the waveguide. FIG. 2 displays the results of the waveguide disturbance detection method analysis described above applied to data obtained for a continuous, undisturbed waveguide. Because there is no disturbance present inside the waveguide, the horizontally polarized source produces strong symmetric x and antisymmetric z components, as shown in FIG. 2 while showing virtually nonexistent symmetric z and antisymmetric x components. This result is in direct agreement with the predictions shown in Table 1 hereinabove.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A method for detection of a disturbance in a waveguide comprising the steps of:

transmitting a wavefield having symmetric and antisymmetric components from at least one of a horizontally polarized source, a vertically polarized source, and a pressure source disposed symmetrically with respect to a longitudinal central axis of a waveguide at one end of said waveguide;

recording at least one of a horizontal component, a vertical component, and a pressure of said wavefield with a vertical array of receivers disposed at an opposite end of said waveguide;

transforming said wavefield into wavenumber domain producing a wavefield transform;

separating said wavefield transform into said symmetric and antisymmetric components;

integrating said symmetric and antisymmetric components over a broad frequency range; and comparing a magnitude of said symmetric components and said antisymmetric components to an expected magnitude for said symmetric components and said antisymmetric components for a waveguide of uniform thickness and properties, thereby determining whether or not a disturbance is present inside said waveguide.

2. A method in accordance with claim 1, wherein a central frequency excited by said source produces a wavelength about equal to or less than the thickness of said waveguide.

3. A method in accordance with claim 1, wherein said wavefield comprises a plurality of elastic waves.

4. A method in accordance with claim 1, wherein said wavefield comprises a plurality of acoustic waves.

5. A method in accordance with claim 1, wherein said wavefield comprises a plurality of electromagnetic waves.

* * * * *